H. MARMON.
OILING SYSTEM FOR ENGINES.
APPLICATION FILED JULY 13, 1914.

1,256,242.

Patented Feb. 12, 1918.
2 SHEETS—SHEET 2.

WITNESSES:
Frank A. Fahle
Josephine Gasper

INVENTOR
Howard Marmon,
BY
Hood & Schley
ATTORNEYS

UNITED STATES PATENT OFFICE.

HOWARD MARMON, OF INDIANAPOLIS, INDIANA.

OILING SYSTEM FOR ENGINES.

1,256,242.

Specification of Letters Patent.   Patented Feb. 12, 1918.

Application filed July 13, 1914.   Serial No. 850,819.

*To all whom it may concern:*

Be it known that I, HOWARD MARMON, a citizen of the United States, residing at Indianapolis, in the county of Marion and State of Indiana, have invented a new and useful Oiling System for Engines, of which the following is a specification.

It is the object of my present invention to provide a more efficient oiling system for rotating shafts, especially the cam shafts of internal combustion engines, and the parts operated thereby, whereby the wear of the parts and the noise usually incident to their operation are much reduced.

In carrying out my invention in an internal combustion engine, I mount the cam shaft in a closed chamber into which the valve-operating members project, and supply oil under pressure to such chamber by the operation of the engine; and I also make hollow the reciprocating valve-operating members operated by the cam shaft, having them open both into the shaft-containing chamber and at their ends which bear against the valve stems, so that oil may be supplied through said members to the bases of the valve stems to maintain a constant film of oil at this point where continual tapping occurs.

The accompanying drawings illustrate my invention.

Figure 1:
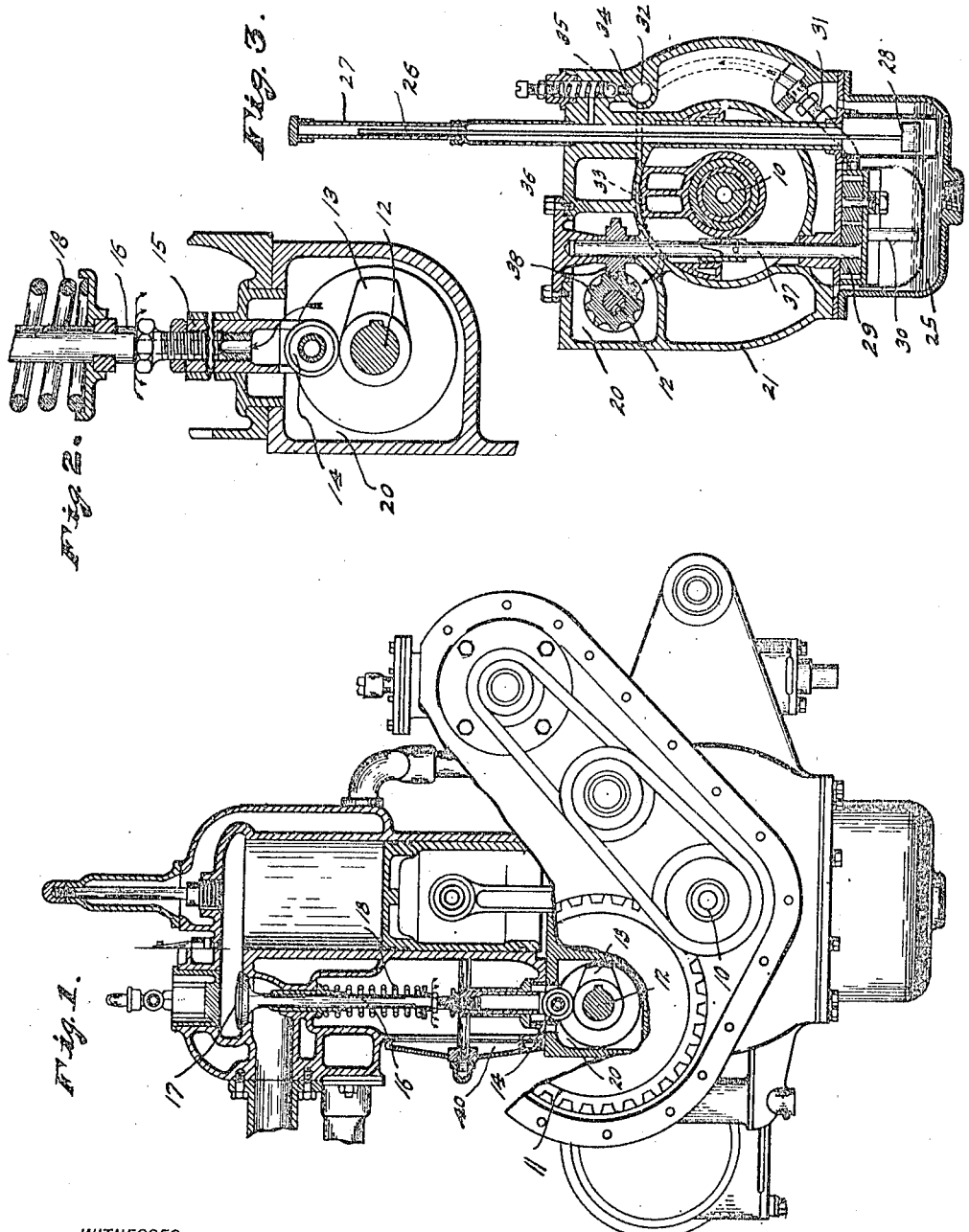
Figure 2:
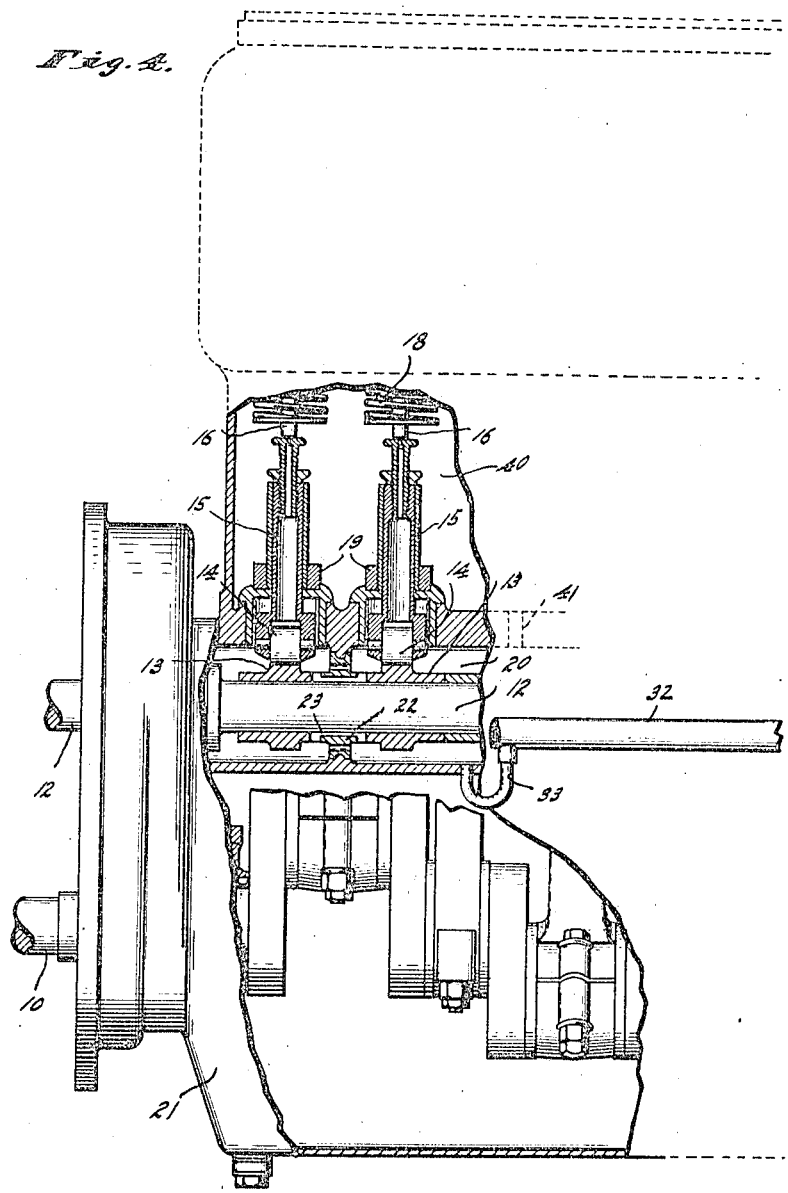

In these drawings, Figure 1 is an end view, with some parts in section, of an internal combustion engine embodying my invention; Fig. 2 is an enlarged cross sectional view through the cam shaft and the chamber in which it is contained; Fig. 3 is a cross sectional view through the lower part of the engine, showing the arrangement for supplying oil under pressure to the chamber containing the cam shaft; and Fig. 4 is a partial side view of the engine with some parts in section through the cam shaft and its containing chamber.

The crank shaft 10 of the engine is connected by suitable gearing 11 to the cam shaft 12, for driving the latter at proper speed, and the cam shaft 12 carries the necessary cams 13 which coöperate with rollers 14 mounted on the lower ends of reciprocating valve-operating members 15 the upper ends of which bear against the lower ends of valve stems 16 of the ordinary inlet and exhaust valves 17 of the engine, these valves 17 being shown as spring-pressed to closed position by springs 18. The valve-operating members 15 are slidably mounted in substantially oil-tight bearings 19, and are shown as made in two parts screw-threaded together so as to provide for adjusting their length. The valve-operating members 15 are tubular, opening at their lower ends into the chamber 20 and at their upper ends to the surface on which they are engaged by the lower ends of the valve stems 16.

The cam shaft 12 is mounted within a chamber or tunnel 20, the walls of which are conveniently integral parts of the crank case 21. This chamber or tunnel extends the full length of the crank case, and is of proper size to receive the cam shaft and the cams thereon. There are suitable bearings at the ends of this chamber 20, for allowing the cam shaft 12 to project through for connection to the gears 11, and there are also a number of intermediate bearings 22 for supporting the cam shaft 12 between the various cams 13. These bearings 22 are provided with oil passages 23 extending through them from side to side, for a purpose which will appear later.

At the bottom of the crank case is an oil well 25, the oil level in which is indicated by a rod 26 which projects up into a glass tube 27 and is attached at its lower end to a float 28 which rises and falls with the oil level. A pump 29, shown as a simple gear pump, has its intake 30 dipping into the oil in the oil well 25, and its discharge 31 leading to a pipe or tube 32 which is connected to various points to be oiled and is also connected, by a pipe 33, to the chamber 20 containing the cam shaft 12. The pipe 32 also has a safety outlet 34 which is normally closed by a spring-pressed ball 35 but which opens under sufficient pressure to move such ball to allow the passage of oil from such pipe 32 to the oil well 25, as by way of the tube 36 through which the rod 26 extends. The pump 29 is driven in any suitable manner, preferably from the engine itself, and is shown as having its driving shaft 37 connected by spiral gears 38 to the cam shaft 12 (see Fig. 3), so that when the engine is operating and drives the cam shaft, the cam shaft in turn drives the pump 29.

Thus in operation, the pump 29 sucks oil from the oil well 25 and forces it into the pipe 32, whence it is supplied by the tube 33 to the chamber 20, as is clear from Figs. 3 and 4. The oil thus forced into the chamber 20 is under pressure, and completely fills such chamber, passing from one end of it to the other through the holes 23 in the intermediate bearings 22. By this arrangement the cam shaft 12 is completely immersed in oil, as are also the rollers 14, so that perfect lubrication of such rollers is maintained and the wear of both rollers and cams and the noise produced by their coöperation are almost totally eliminated. Furthermore, the oil under pressure in the chamber 20 is forced up through the hollow valve-operating members 15 against the lower ends of the valve stems 16, where the oil spreads out between such lower ends and the upper ends of the valve-operating members 15 to form a film of oil which acts effectively to avoid practically all the noise which is caused by the tapping between the members 15 and 16. The oil which thus escapes from the chamber 20 through the valve-operating members 15 passes into a chamber 40 whence it returns by way of openings 41 into the crank case 21, from which it falls again into the oil well 25 for re-use.

I claim as my invention:

1. In an internal combustion engine, the combination of a cam shaft having a cam thereon, a chamber in which said cam shaft is mounted, a valve-operating member projecting into said chamber for coöperating with said cam, a valve stem bearing against said valve-operating member, said valve-operating member being hollow and opening into said chamber and to the surface against which said valve stem bears for allowing the passage of oil from such chamber to such surface, and means for supplying oil to said chamber.

2. The combination of a valve having a reciprocable stem, a reciprocable valve-operating member coöperating with said stem for operating it, means for reciprocating said valve-operating member, one of said reciprocating parts having within it a passageway communicating with the space between the meeting ends of said member and stem, and a pump for supplying fluid to said passageway.

3. In an internal combustion engine, the combination with a cylinder and the valves therefor, valve stems for said valves, a cam shaft for actuating said valves, a closed chamber surrounding said cam shaft, slidable valve lifters operatively engaging said valve stems and projecting into said chamber and operatively engaging the cams on the cam shaft, and means for supplying a lubricant to said chamber and maintaining the same under pressure therein.

In witness whereof I have hereunto set my hand at Indianapolis, Indiana, this 10th day of July. A. D. one thousand nine hundred and fourteen.

HOWARD MARMON.

Witnesses:
 FRANK A. FAHLE,
 ARTHUR M. HOOD.